(12) United States Patent
Wayne et al.

(10) Patent No.: US 11,977,967 B2
(45) Date of Patent: May 7, 2024

(54) MEMORY AUGMENTED GENERATIVE TEMPORAL MODELS

(71) Applicant: DeepMind Technologies Limited, London (GB)

(72) Inventors: Gregory Duncan Wayne, London (GB); Chia-Chun Hung, London (GB); Mevlana Celaleddin Gemici, Istanbul (TR); Adam Anthony Santoro, London (GB)

(73) Assignee: DeepMind Technologies Limited, London (GB)

( * ) Notice: Subject to any disclaimer, the term of this patent is extended or adjusted under 35 U.S.C. 154(b) by 490 days.

(21) Appl. No.: 17/113,669

(22) Filed: Dec. 7, 2020

(65) Prior Publication Data

US 2021/0089968 A1 Mar. 25, 2021

Related U.S. Application Data

(63) Continuation of application No. 16/459,113, filed on Jul. 1, 2019, now Pat. No. 10,872,299, which is a
(Continued)

(51) Int. Cl.
*G06N 3/06* (2006.01)
*G06N 3/0455* (2023.01)
(Continued)

(52) U.S. Cl.
CPC .............. *G06N 3/06* (2013.01); *G06N 3/0455* (2023.01); *G06N 3/049* (2013.01); *G06N 20/00* (2019.01);
(Continued)

(58) Field of Classification Search
CPC ...... G06N 20/00; G06N 3/0455; G06N 3/049; G06N 3/044; G06N 3/045; G06N 3/047;
(Continued)

(56) References Cited

U.S. PATENT DOCUMENTS 8,630,975 B1 1/2014 Guo
9,015,093 B1 4/2015 Commons
(Continued)

FOREIGN PATENT DOCUMENTS

CN 106056213 10/2016
EP 3312777 4/2018
WO WO2016145379 9/2016

OTHER PUBLICATIONS

Gulcehre et al., "Memory Augmented Neural Networks with Wormhole Connections" Jan. 30, 2017, arXiv: 1701.08718v1, pp. 1-27. (Year: 2017).*

(Continued)

*Primary Examiner* — Vincent Gonzales
*Assistant Examiner* — Chase P. Hinckley
(74) *Attorney, Agent, or Firm* — Fish & Richardson P.C.

(57) ABSTRACT

Methods, systems, and apparatus, including computer programs encoded on a computer storage medium, for generating sequences of predicted observations, for example images. In one aspect, a system comprises a controller recurrent neural network, and a decoder neural network to process a set of latent variables to generate an observation. An external memory and a memory interface subsystem is configured to, for each of a plurality of time steps, receive an updated hidden state from the controller, generate a memory context vector by reading data from the external memory using the updated hidden state, determine a set of latent variables from the memory context vector, generate a predicted observation by providing the set of latent variables to the decoder neural network, write data to the external memory using the latent variables, the updated hidden state, or both, and generate a controller input for a subsequent time step from the latent variables.

20 Claims, 3 Drawing Sheets

Related U.S. Application Data continuation of application No. PCT/IB2018/050742, filed on Feb. 6, 2018.

(60) Provisional application No. 62/455,387, filed on Feb. 6, 2017.

(51) Int. Cl.
*G06N 3/049* (2023.01)
*G06N 20/00* (2019.01)
*G06F 16/908* (2019.01)
*G06N 3/084* (2023.01)

(52) U.S. Cl.
CPC .. *G05B 2219/33025* (2013.01); *G06F 16/908* (2019.01); *G06N 3/084* (2013.01)

(58) Field of Classification Search
CPC . G06N 3/084; G06N 3/06; G05B 2219/33025
See application file for complete search history.

(56) References Cited

U.S. PATENT DOCUMENTS

| | | | |
|---|---|---|---|
| 9,911,413 B1 | 3/2018 | Kumar | |
| 10,049,106 B2 | 8/2018 | Goyal | |
| 10,089,576 B2 * | 10/2018 | Gao | G06F 16/9535 |
| 10,366,158 B2 * | 7/2019 | Bellegarda | G06N 3/02 |
| 10,565,493 B2 | 2/2020 | Merity | |
| 10,599,701 B2 | 3/2020 | Liu | |
| 10,831,577 B2 * | 11/2020 | Okanohara | G06N 3/045 |
| 10,832,134 B2 * | 11/2020 | Graves | G06N 3/0442 |
| 11,080,587 B2 * | 8/2021 | Gregor | G06N 3/044 |
| 2012/0330631 A1 | 12/2012 | Emigholz | |
| 2014/0279777 A1 | 9/2014 | Cornebise | |
| 2015/0324655 A1 | 11/2015 | Chalasani | |
| 2016/0004690 A1 | 1/2016 | Bangalore | |
| 2016/0352656 A1 | 12/2016 | Galley | |
| 2017/0127016 A1 * | 5/2017 | Yu | G06N 3/084 |
| 2017/0161635 A1 * | 6/2017 | Oono | G06N 3/084 |
| 2017/0200077 A1 | 7/2017 | Weston | |
| 2017/0206464 A1 * | 7/2017 | Clayton | G06N 3/044 |
| 2017/0323636 A1 | 11/2017 | Xiao | |
| 2018/0005082 A1 * | 1/2018 | Bluche | G06V 30/18057 |
| 2018/0046614 A1 * | 2/2018 | Ushio | G06N 3/044 |
| 2018/0060301 A1 | 3/2018 | Li | |
| 2018/0060666 A1 * | 3/2018 | Song | G06N 3/04 |
| 2018/0101784 A1 * | 4/2018 | Rolfe | G06F 15/80 |
| 2018/0124423 A1 * | 5/2018 | Choi | G06V 10/82 |
| 2018/0144248 A1 * | 5/2018 | Lu | G06V 10/955 |
| 2018/0165590 A1 | 6/2018 | Vlassis | |
| 2018/0189274 A1 | 7/2018 | Noh | |
| 2018/0189572 A1 * | 7/2018 | Hori | G06N 3/044 |
| 2018/0247200 A1 | 8/2018 | Rolfe | |
| 2018/0261214 A1 * | 9/2018 | Gehring | G06N 3/04 |
| 2019/0018933 A1 * | 1/2019 | Oono | G06N 3/045 |
| 2019/0220691 A1 | 7/2019 | Valpola | |
| 2019/0324988 A1 | 10/2019 | Wayne | |
| 2019/0325298 A1 * | 10/2019 | Chen | G06N 3/063 |
| 2020/0183963 A1 * | 6/2020 | Ghaeini | G06F 16/3329 |
| 2022/0076131 A1 * | 3/2022 | Rolfe | G06N 3/088 |

OTHER PUBLICATIONS

Eslami et al., "Attend, Infer, Repeat: Fast Scene Understanding with Generative Models" Aug. 12, 2016, arXiv: 1603.08575v3, pp. 1-17. (Year: 2016).*
Miao et al., "Neural Variational Inference for Text Processing" Jan. 7, 2016, arXiv: 1511.06038v3, pp. 1-15. (Year: 2016).*
Graves et al., "Neural Turing Machines" Dec. 10, 2014, arXiv: 1410.5401v2, pp. 1-26. (Year: 2014).*
Kim et al., "Structured Attention Networks" Feb. 3, 2017, arXiv: 1702.00887v1, pp. 1-21. (Year: 2017).*
Sun et al., "Multi-digit Image Synthesis using Recurrent Conditional Variational Autoencoder" Nov. 3, 2016, IEEE, pp. 375-380. (Year: 2016).*
Fakoor et al., "Memory-Augmented Attention Modelling for Videos" Nov. 14, 2016, arXiv: 1611.02261v2, pp. 1-10. (Year: 2016).*
Graves, Alex, "Adaptive Computation Time for Recurrent Neural Networks" Feb. 2, 2017, arXiv: 1603.08983v5, pp. 1-19. (Year: 2017).*
Im et al., "Denoising Criterion for Variational Autoencoding Framework" Jan. 4, 2016, arXiv: 1511.06406v2, pp. 1-14. (Year: 2016).*
Kulkarni et al., "Hierarchical Deep Reinforcement Learning: Integrating Temporal and Intrinsic Motivation" May 31, 2016, arXiv: 1604.06057v2, pp. 1-14. (Year: 2016).*
Mittal et al., "Sync-DRAW: Automatic GIF Generation using Deep Recurrent Attentive Architectures" Nov. 30, 2016, arXiv: 1611.10314v1, pp. 1-9. (Year: 2016).*
Patraucean et al., "Spatio-Temporal Video Autoencoder with Differentiable Memory" Sep. 1, 2016, arXiv: 1511.06309v5, pp. 1-13. (Year: 2016).*
Sohn et al., "Learning Structured Output Representation using Deep Conditional Generative Models" 2015, pp. 1-9. (Year: 2015).*
Wang et al., "Memory-enhanced Decoder for Neural Machine Translation" Jun. 7, 2016, arXiv: 1606.02003v1, pp. 1-11. (Year: 2016).*
Office Action in Chinese Appln. No. 201880016434.7, dated Sep. 22, 2022, 19 pages (with English translation).
Assael et al., "Data-Efficient Learning of Feedback Policies from Image Pixels using Deep Dynamical Models," arXiv, Oct. 9, 2015, 10 pages.
Bayer et al., "Learning Stochastic Recurrent Networks," arXiv, Mar. 5, 2015, 9 pages.
Bayesian Filtering and Smoothing, vol. 3, Cambridge University Press, 2013.
Bialek et al., "Predictability, Complexity, and Learning," Neural Computation, Nov. 2001, 13(11):2409-2463.
Charles et al., "Distributed Sequence Memory of Multidimensional Inputs in Recurrent Networks," Journal of Machine Learning Research, Jan. 2017, 18:1-37.
Cheng et al., "Long Short-Term Memory-Networks for Machine Reading," CoRR, Jan. 2016, arxiv.org/abs/1601.06733, 11 pages.
Chung et al., "A Recurrent Latent Variable Model for Sequential Data," Advances in Neural Information Processing Systems, 2015, 8 pages.
Chung et al., "A recurrent latent variable model for sequential data," arXiv, Apr. 6, 2016, 9 pages.
Chung et al., "Empirical Evaluation of Gated Recurrent Neural Networks on Sequence Modeling," arXiv, Dec. 11, 2014, 9 pages.
Chung et al., "Gated Feedback Recurrent Neural Networks," arXiv, 2015, 9 pages.
Chung et al., "Gated Feedback Recurrent Neural Networks," International conference on machine learning, Jun. 2015, pp. 2067-2075.
Dai et al., "Discriminative Embeddings of Latent Variable Models for Structured Data," International conference on machine learning, Jun. 2016, pp. 2702-2711.
Deisenroth et al., "PILCO: A model-based and data-efficient Approach to Policy Search," Proceedings of the 28th International Conference on Machine Learning (ICML-11), 2011, 8 pages.
Dyer et al., "Transition-Based Dependency Parsing with Stack Long Short-Term Memory," CoRR, May 2015, arxiv.org/abs/1505.08075, 10 pages.
EP Office Action in European Appln. 18708482.7-1221, dated Aug. 23, 2019, 3 pages.
Eslami et al., "Attend, Infer, Repeat: Fast Scene Understanding with Generative Models," Advances in Neural Information Processing Systems, 2016, 9 pages.
Fraccaro et al., "Generative Temporal Models with Spatial Memory for Partially Observed Environments," CoRR, Apr. 2018, arxiv.org/abs/1804.09401, 13 pages.
Fraccaro et al., "Sequential Neural Models with Stochastic Layers," Advances in Neural Information Processing Systems, 2016, 9 pages.
Gepperth et al., "Learning to be attractive: probabilistic computation with dynamic attractor networks," Joint IEEE International

(56) References Cited

OTHER PUBLICATIONS

Conference on Development and Learning and Epigenetic Robotics (ICDL-Epi Rob), Sep. 2016, pp. 270-277.
Gershnnan et al., "Statistical Computations Underlying the Dynamics of Memory Updating," PLOS Computational Biology, Nov. 2014, 10(11):1-13.
Ghahramani et al., "Parameter Estimation for Linear Dynammical Systems," Technical Report CRG-TR-96-2, Feb. 1996, 6 pages.
Grave et al., "Hybrid computing using a neural network with dynamic external memory," Nautre, Oct. 12, 2016, 20 pages.
Graves et al., "Hybrid computing using a neural network with dynamic external memory," Nature, Oct. 27, 2016, 538(7626):471-476.
Graves et al., "Neural Turing Machines," arXiv, Dec. 2014, 26 pages.
Grefenstette et al., "Learning to Transduce with Unbounded Memory," Advances in Neural Information Processing Systems, 2015, 9 pages.
Gregor et al., "DRAW: a recurrent neural network for image generation," arXiv, May 20, 2015, 10 pages.
Gregor et al., "Towards Conceptual Compression," Advances in Neural Information Processing Systems 29 (NIPS 2016), Apr. 2016, 9 pages.
Gulcehre et al., "Dynamic neural turing machine with soft and hard addressing schemes," arXiv, Mar. 17, 2017, 24 pages.
Gulcehre et al., "Memory Augmented Neural Networks with Wormhole Connections," CoRR, Jan. 2017, arxiv.org/abs/1701.08718, 27 pages.
He et al., "Deep Residual Learning for Image Recognition," arXiv, 2015, 9 pages.
Henaff et al., "Tracking the world state with recurrent entity networks," arXiv, May 10, 2017, 15 pages.
Hermann et al., "Teaching machines to read and comprehend," Advances in Neural Information Processing Systems, 2015, 9 pages.
Hochreiter et al., "Long Short-term Memory," Neural Computation, Nov. 1997, 9(8):1735-1780.
Ji et al., "A Latent Variable Recurrent Neural Network for Discourse Relation Language Models," CoRR, Mar. 2016, arxiv.org/abs/1603.01913, 11 pages.
Joulin et al., "Inferring Algorithmic Patterns with Stack-Augmented Recurrent Nets," Advances in Neural Information Processing Systems, 2015, 9 pages.
Kadlec et al., "Text Understanding with the Attention Sum Reader Network," arXiv, Jun. 24, 2016, 11 pages.
Kalman, "A New Approach to Linear Filtering and Prediction Problems," Journal of Basic Engineering, 1960, 12 pages.
Kim et al., "Structured Attention Networks," CoRR, Feb. 2017, arxiv.org/abs/1702.00887, 21 pages.
Kingma et al., "Adam: A Method for Stochastic Optimization," Published as Conference Paper at ICLR 2015, 15 pages.
Kingma et al., "Auto-Encoding Variational Bayes," arXiv, May 1, 2014, 14 pages.
Kumar et al., "Ask Me Anything: Dynamic Memory Networks for Natural Language Processing," arXiv, 2015, 10 pages.
Lake et al., "Human-level concept learning through probabilistic program induction," Science, 2015, 350(6266):1332-1338.
Levine et al., "Learning Neural Network Policies with Guided Policy Search Under Unkown Dynamics," Advances in Neural Information Processing Systems, 2014, pp. 1071-1079.
Li et al., "FPGA Acceleration of Recurrent Neural Networks based Language Model," IEEE 23rd Annual International Symposium on Field-Programmable Custom Computing Machines, May 2015, pp. 111-118.
Li et al., "Learning to generate with memory," arXiv, May 28, 2016, 12 pages.
Li et al., "Salience estimation via variational auto-encoders for multi-document summarization," Semantic Scholar, Feb. 4, 2017, 7 pages.
Liang et al., "Neural symbolic machines: learning semantic parsers on freebase with weap supervision," arXiv, Apr. 23, 2017, 12 pages.
Liu et al., "Temporal Learning and Sequence Modeling for a Job Recommender System," RecSys Challenge, Sep. 2016, pp. 1-4.
Mescheder et al., "Adversarial Variational Bayes: Unifying Variational Autoencoders and Generative Adversarial Networks," CoRR, Jan. 2017, 14 pages.
Mnih et al., "Neural Variational Inference and Learning in Belief Networks," CoRR, Jan. 2014, arxiv.org/abs/1402.0030, 10 pages.
PCT International Preliminary Report on Patentability in International Appln. No. PCT/IB2018/050742, dated Aug. 15, 2019, 9 pages.
PCT International Search Report and Written Opinion in International Appln. PCT/IB2018/050742, dated Jun. 4, 2018, 16 pages.
Pearlmutter, "Gradient Calculations for Dynamic Recurrent Neural Networks: A Survey," IEEE Transactions on Neural Networks, 1995, 6(5):1212-1228.
Rabiner, "A tutorial on hidden markov models and selected applications in speech recognition," Proceedings of the IEEE, Feb. 1989, 77(2):257-286.
Ranganath et al., "Hierarchical Variational Models," International Conference on Machine Learning, 2016, 10 pages.
Ranzato et al., "Modeling Natural Images Using Gated MRFs," IEEE Transactions on Pattern Analysis and Machine Intelligence, Jan. 2013, 35(9):2206-2222.
Ray et al., "Improving the Discovery and Characterization of Hidden Variables by Regularizing the LO-net," 10th International Conference on Machine Learning and Applications and Workshops, Dec. 2011, pp. 442-447.
Rezende et al., "Stochastic Backpropagation and Approximate Inference in Deep Generative Models," arXiv, May 30, 2014, 14 pages.
Rezende et al., "Variational Inference with Normalizing Flows," arXiv, Jun. 14, 2016, 10 pages.
Ribeiro et al., "Complexity-Aware Assignment of Latent Values in Discriminative Models for Accurate Gesture Recognition," 29th SIBGRAPI Conference on Graphics, Patterns, and Images, Oct. 2016, pp. 378-385.
Riedel et al., "Programming with a Differentiable Forth Interpreter," arXiv, May 21, 2016, 11 pages.
Santoro et al., "One Shot Learning with Memory-Augmented Neural Networks," arXiv, May 19, 2016, 13 pages.
Serban et al., "A Hierarchical Latent Variable Encoder-Decoder Model for Generating Dialogues," CoRR, May 2016, arxiv.org/abs/1605.06069, 15 pages.
Serban et al., "Multi-Modal Variational Encoder-Decoders," CoRR, Dec. 2016, openreview.net/forum?id=BJ9fZNqle, 18 pages.
Shang et al., "Neural Responding Machine for Short-Text Conversation" CoRR, Mar. 2015, arxiv.org/abs/1503.02364, 12 pages.
Sukhbaatar et al., "End-to-end Memory Networks," Advances in Neural Information Processing Systems, 2015, 9 pages.
Sutton, "Dyna, an integrated architecture for learning, planning and reacting," ACM Sigart Bulletin, Aug. 1991, 2(4):160-163.
Tornio et al., "Time Series Prediction with Variational Bayesian Nonlinear State-Space Models," Proc. European Symp. On Time Series Prediction (ESTSP07), 2007, 9 pages.
Van den Oord et al., "Pixel Recurrent Neural Networks," Proceedings of the 33rd International Conference on Machine Learning, Aug. 2016, 11 pages.
Venkatarannan et al., "Joint Modeling of Anatomical and Functional Connectivity for Population Studies," IEEE Transactions on Medical Imaging, Aug. 2011, 31(2):164-182.
Vinyals et al., "Pointer Networks," Advances in Neural Information Processing Systems, 2015, 9 pages.
Watter et al., "Embed to Control: A Locally Linear Latent Dynamics Model for Control from Raw Images," Advances in Neural Information Processing Systems, 2015, 9 pages.
Weston et al., "Memory Networks," arXiv, Nov. 29, 2015, 15 pages.
Office Action in Chinese Appln. No. 201880016434.7, dated May 20, 2023, 14 pages (with English translation).

(56) References Cited

OTHER PUBLICATIONS

Office Action in European Appln. No. 18708482.7, dated Jan. 2, 2024, 9 pages.

* cited by examiner

MEMORY AUGMENTED GENERATIVE TEMPORAL MODELS

CROSS-REFERENCE TO RELATED APPLICATION

This application is a continuation of U.S. application Ser. No. 16/459,113, filed Jul. 1, 2019, which is a continuation of International Application No. PCT/IB2018/050742, filed Feb. 6, 2018, which claims the benefit under 35 U.S.C. 119 of Provisional Application No. 62/455,387, filed Feb. 6, 2017, all of which are incorporated by reference.

BACKGROUND

This specification relates to neural network systems that generate data items.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that generates sequences of predicted observations.

Systems of this type are a core component of many machine learning and control systems. For example the predicted observations may be used in a control task in a real or simulated environment to predict the outcome of a planned action in the environment. The predictions may be learned from observations derived from one or more sensors; a predicted observation may comprise data generated as if from the sensor(s) at a future time. More generally the observations and the predicted observations may comprise data such as audio data, still or moving image data, data defining the state or motion of an object, medical data such as biomarker data, spatio-temporal data relating to physical and/or chemical processes, and so forth.

Thus according to a first aspect there is provided a system comprising one or more computers and one or more storage devices storing instructions that when executed by the one or more computers cause the one or computers to implement a controller recurrent neural network and a decoder neural network. The controller recurrent neural network is configured to, for each of a plurality of time steps, receive a controller neural network input for the time step, and process the controller neural network input for the time step in accordance with a current hidden state to generate an updated hidden state for the time step. The decoder neural network is configured to receive a decoder neural network input comprising a set of latent variables that collectively define a compressed representation of an observation characterizing an environment; and process the decoder neural network input comprising the set of latent variables to generate the observation characterizing the environment.

The system further comprises an external memory (which may also be referred to herein as a "memory", and a memory interface subsystem configured to perform operations comprising, for each of the time steps, receiving the updated hidden state for the time step; and generating a memory context vector by reading data from the external memory using the updated hidden state. The operations may further comprise determining, from at least the memory context vector, a set of latent variables for the time step, for example by mapping from the memory context vector to the set of latent variables using a prior map, as described later. The operations may further comprise generating a predicted observation for the time step by providing the set of latent variables as input to the decoder neural network. The operations may further comprise writing data to the external memory using, for example directly or indirectly determined by, the latent variables, the updated hidden state, or both. The operations may further comprise generating a controller neural network input for a subsequent time step from the latent variables for the time step.

As described in more detail later, such systems can demonstrate efficient recall of sparse, long-term temporal dependencies in the observations.

Writing data to the external memory may comprise writing the latent variables for the time step, or transformed versions of the latent variables, to the external memory. In some implementations this may comprise writing the latent variables (or transformed latent variables) to a specified location in the external memory, for example the next location in a buffer. In some implementations, for example implementations employing content-based addressing, data may be written to (and read from) any location(s).

Thus in a content-based addressing approach writing data to the external memory may comprises generating a set of writing weights including a respective writing weight for each of a plurality of locations in the external memory, and writing data defined by the updated hidden state to the locations in the external memory in accordance with the writing weights.

The memory context vector may be a vector derived from data stored in the memory which provides context for generating the predicted observation. The memory context vector may comprise the data read from the external memory, more particularly a weighted sum of data read from the external memory. Generating a memory context vector may thus comprise, for each of one or more read heads, generating a set of reading weights for the read head from the updated hidden state, wherein the set of reading weights includes a respective reading weight for each of a plurality of locations in the external memory; and reading data from the plurality of locations in the external memory in accordance with the reading weights. Here "read head" is used to refer to a set of reading weights. Where multiple read heads are employed the data from these may be combined, for example concatenated, to generate the memory context vector.

The reading weights may be position-based addressing weights, for accessing data in the external memory based on position, for example an address location count; or the reading weights may be content-based addressing weights, for example for accessing memory locations based on the similarity of their content to target content such as one or more keys. In some implementations the reading weights may be determined by a combination of position-based addressing weights and content-based addressing weights. Similarly writing data into the external memory may comprise a combination of position-based and content-based addressing, combining direct writing of the latent variables, or transformed versions of the latent variables, with content-based addressing as previously described.

Determining a set of latent variables for a time step may comprise mapping, using a prior map, for example a prior generation neural network, a prior map input comprising the set of latent variables to, for each of the latent variables, parameters of a prior distribution over possible latent variable values for the latent variable. The latent variables may then be sampled from the prior distributions. The prior map input may be a combination of the set of latent variables and the updated hidden state of the controller neural network. The prior generation neural network may comprise one or more linear neural network layers to map the prior map input to the distribution parameters.

During training determining a set of latent variables for the time step may comprise receiving an actual observation for the time step, processing the memory context vector and the actual observation using a posterior map neural network to generate, for each of the latent variable, parameters of a posterior distribution over possible latent variable values for the latent variable, and sampling the latent variables from the posterior distributions for the latent variables in accordance with the distribution parameters.

Generating a controller neural network input for a subsequent time step from the latent variables for a time step may comprise providing the latent variables for the time step as the controller neural network input for the next time step. Optionally the latent variables for the time step may be combined with an external context vector and/or data read from the external memory to generate the controller neural network input for the next time step. Put differently the controller neural network input for a time step may comprise latent variables for a preceding time step and an external context vector for the time step. The external context vector may represent one or more external variables that influence characteristics of observations generated by the system. For example the external context vector may comprise data defining the (planned) position and/or state of an agent in the environment; and/or data defining the position and/or state of a sensor in the environment; and/or data defining a future time and/or spatial location.

Particular embodiments of the subject matter described in this specification can be implemented so as to realize one or more of the following advantages.

The generative system as described in this specification uses an external memory to store information for future use over many time steps. By using an external memory, the generative system as described in this specification separates memory storage from computation. In contrast, some conventional generative systems use, for example, the internal state of a long short-term memory (LSTM) network both for memory storage and for computation. In such conventional systems, the parametric complexity of the system (e.g., the number of parameters required to effectively perform the functionality of the system) may grow quadratically with the memory capacity of the system (e.g., the quantity of information that can be stored by the system for future use). For example, doubling the memory capacity may result in a 4-times increase in the number of model parameters. Since the generative system as described in this specification separates memory storage from computation, increasing its memory capacity results in a corresponding constant or linear increase in the parametric complexity of the system (e.g., doubling the memory capacity may result in a proportional doubling of the number of model parameters). Therefore, the generative system as described in this specification may consume fewer computational resources (e.g., memory resources and computing power) than conventional generative systems. Moreover, in conventional systems that use, for example, the internal state of an LSTM both for memory storage and for computation, the conventional system is required to use the internal state of the LSTM both (i) to preserve information in a stable manner for later retrieval and to (ii) distill information for immediate use. Using the internal state of the LSTM simultaneously for both competing purposes degrades the performance of the conventional system (e.g., by causing the conventional system to generate less accurate sequences of predicted observations). Since the generative system as described in this specification separates memory storage from computation, it avoids these performance degrading effects and therefore can achieve a better performance (e.g., more accurate sequences of predicted observations) than some conventional systems.

The generative system as described in this specification can adaptively update its external memory to discard less useful information, and to store useful information capturing long-range dependencies over many time steps. In contrast, some conventional models generate sequences of observations based on the assumption that future observations depend on fixed, predetermined numbers of past observations. By using an external memory that can adaptively store relevant information from any previous time step, the generative system as described in this specification can generate sequences of predicted observations that capture long-range dependencies over many time steps better than some conventional models, and therefore achieve better performance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
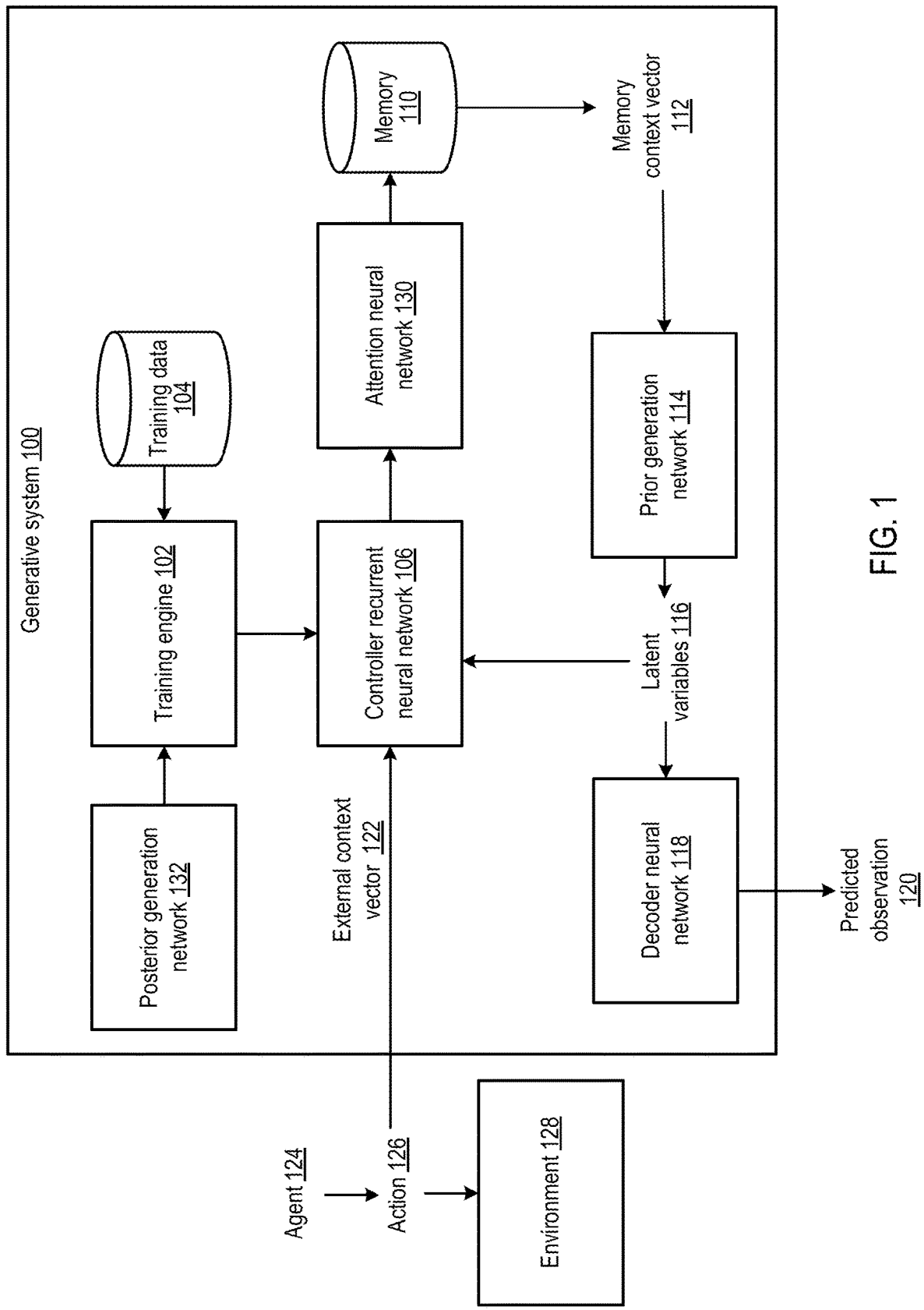
FIG. 1 shows an example generative system.

FIG. 1 shows an example generative system 100. The generative system 100 is an example of a system implemented as computer programs on one or more computers in one or more locations in which the systems, components, and techniques described below are implemented.

The generative system 100 generates, at each of multiple time steps, a predicted observation 120 of an environment 128. The predicted observations 120 are ordered collections of numerical values that characterize predicted future states of the environment 128.

As will be described in more detail below, the system 100 generates the sequence of predicted observations 120 by generating a sequence of latent variables 116 (that are compressed representations of respective predicted observations). The system stochastically generates the latent variables 116 for each time step by processing data read from an (external) memory 110 (which may also be referred to herein as the "memory 110"). The memory 110 includes information characterizing predicted observations of the environment at previous time steps. The system also adaptively updates the memory 110 at each time step by writing data to the memory 110. The system 100 mediates adaptively writing to and reading from the memory 110 by a controller recurrent neural network 106.

In some implementations, the environment 128 is an environment that is being interacted with by an agent 124 performing actions 126. For example, the environment 128 may be a simulated environment and the agent 124 may be implemented as one or more computer programs interacting with the simulated environment. For example, the simulated environment may be a video game and the agent 124 may be a simulated user playing the video game. As another example, the simulated environment may be a motion simulation environment, e.g., a driving simulation or a flight simulation, and the agent 124 is a simulated vehicle navigating through the motion simulation. In these implementations, the actions 126 may be points in a space of possible control inputs to control the simulated user or simulated vehicle.

As another example, the environment 128 is a real-world environment and the agent 124 is a mechanical agent interacting with the real-world environment. For example, the agent 124 may be a robot interacting with the environment to accomplish a specific task. As another example, the agent 124 may be an autonomous or semi-autonomous vehicle navigating through the environment.

In some of these cases, the predicted observations 120 characterize predicted states of the environment 128 using low-dimensional feature vectors that characterize the state of the environment 128. In these cases, values of different dimensions of the low-dimensional feature vectors may have varying ranges.

In some others of these cases, the predicted observations 120 characterize predicted states of the environment 128 using high-dimensional pixel representations of one or more images that characterize the state of the environment, e.g., predicted images of the simulated environment or predicted images as would be captured by sensors of the mechanical agent as it interacts with the real-world environment.

Thus in some implementations the system may be trained on a sequence of observations and may then predict new observations, optionally conditioned on external context data such as agent location, camera angle and the like.

In some other implementations, the environment 128 is a user-specific environment. For example, the environment 128 can be a patient health environment, e.g., for computer-assisted diagnosis, and the predicted observations 120 can be predicted electronic medical data that characterize the health of the patient. As another example, the environment 128 can be a recommendation environment, and the predicted observations 120 can be feature vectors that characterize predicted preferences and interests of a user.

In some other implementations, the environment 128 is an art environment. For example, the environment 128 can be a musical environment, and the predicted observations 120 can be sequences of one or more musical notes. As another example, the environment 128 can be a visual artistic environment, such as a representation of a painting canvas, and the predicted observations 120 can be, for example, paint brush strokes (with a particular color and brush).

In some cases, the system 100 can be used for anomaly detection. For example, the system 100 can be used to generate a database of different sequences of predicted observations of the environment 128. A previously unseen sequence of observations of the environment can be characterized as an anomaly if it is sufficiently different (according to some appropriate measure) from the sequences of predicted observations in the database.

The system 100 includes a memory 110. The memory 110 is a logical data storage area or a physical data storage device. The data stored in the memory 110 is an ordered collection of numerical values that can be represented as a matrix. As will be described in more detail below, at each of the multiple time steps, the system 100 both reads (i.e., extracts) data from the memory 110 and updates the memory 110. Generally, the system 100 uses the memory 110 to store information for use over multiple time steps.

The system 100 includes an attention neural network 130 that is configured to, at each time step, process an attention network input for the time step in accordance with current values of a set of attention network parameters to generate as output one or more different sets of reading weights. Each set of reading weights is an ordered collection of numerical values (e.g., a vector), referred to in this specification as a read head. Each read head includes a respective reading weight for each of multiple locations in the data in the memory 110. For example, if the data in the memory 110 is represented as a matrix, then each read head may include a respective reading weight for each of multiple rows of the data in the memory 110.

The system 100 processes each read head to cause the read head to have unit norm (e.g., with respect to the Euclidean norm) and non-negative values. In some cases, the system 100 causes each read head to have non-negative values by processing the values of each read head with a softmax function.

The attention neural network 130 may be implemented as any appropriate neural network model, for example, as a multi-layer perceptron or a convolutional neural network.

In some implementations, the reading weights of each read head are position-based addressing weights, for example to access data based on the position of the data in the memory. In these implementations, the attention network input for each time step is an updated hidden state of a controller recurrent neural network 106 for the time step (to be described in more detail below), which is processed by the attention network 130 to generate as output the one or more read heads. In these implementations, the attention network 130 does not directly process the data in the memory 110 in generating the read heads.

In some implementations, the reading weights of each read head are content-based addressing weights. In these implementations, the attention network input for each time step is the updated hidden state of the controller network 106 for the time step and the data in the memory 110 for the time step, which are processed by the attention network 130 to generate as output the one or more read heads. In these implementations, the attention network 130 determines each read head by comparing the similarity of data from multiple locations of the data in the memory 110 to a generated cue (as will be described in further detail with reference to the description of FIG. 3).

In some implementations, the reading weights of each read head are a combination of position-based addressing weights and content-based addressing weights. An example of a system that combines variations of position-based addressing weights and content-based addressing weights is described in U.S. patent application Ser. No. 14/885,086. Some prediction tasks are more suited to content-based recall than position-based recall, and vice-versa, and it can be advantageous to use both position-based and content-based addressing.

The system 100 uses the read heads generated by the attention network 130 to read data from the memory 110 and to generate a memory context vector 112 for the time step. Specifically, for each read head, the system 100 generates a different retrieved memory vector (which is an ordered collection of numerical values) and combines the retrieved memory vectors to generate the memory context vector 112 for the time step. The memory context vector 112 is an ordered collection of numerical values. An example process for generating a memory context vector is described with reference to FIG. 3.

The system 100 provides the memory context vector 112 as input to a prior generation network 114. In some implementations, the system 100 further provides latent variables 116 for the previous time step and/or an updated hidden state of a controller network 106 for the time step (both of which are described later) as input to the prior generation network 114. The prior generation network 114 is a neural network that is configured to process the input in accordance with current values of a set of prior generation network parameters to generate as output parameters of a probability distribution (referred to in this specification as a prior distribution). The parameters of the prior distribution define a probability distribution over a multi-dimensional Euclidean space referred to in this specification as a latent state space. For example, the parameters of the prior distribution may be parameters of a mean vector and a covariance matrix of a multi-dimensional Normal distribution over the latent state space. The prior generation network 114 can be implemented as any appropriate neural network model, for example, a convolutional neural network or a multi-layer perceptron.

The system determines the latent variables 116 for the time step by drawing a random sample from the prior distribution generated by the prior generation network 114 for the time step. In general, the latent variables for the time step are a compressed representation of the predicted observation 120 for the time step, i.e., a representation of the predicted observation 120 in the latent state space. For the first time step, the system 100 may determine the latent variables 116 for the time step by drawing a random sample from a predetermined probability distribution over the latent state space (e.g., a Gaussian distribution with zero mean and covariance matrix given by the identity matrix).

The system provides the latent variables 116 for the time step as input to a decoder neural network 118 that is configured to process the latent variables 116 in accordance with current values of a set of decoder neural network parameters to generate as output parameters of a probability distribution (referred to in this specification as an observation distribution). In some implementations, the decoder neural network 118 also receives the updated hidden state of the controller recurrent neural network 106 for the time step (to be described in more detail below) as input. The parameters of the observation distribution define a probability distribution over a multi-dimensional Euclidean space referred to in this specification as an observation space. For example, the parameters of the observation distribution may be parameters of a mean vector and a covariance matrix of a multi-dimensional Normal distribution over the observation space, for example for pixels of an image. The decoder neural network 118 can be implemented as any appropriate neural network model, for example, as a de-convolutional neural network.

The system determines the predicted observation 120 for the time step by drawing a random sample from the observation distribution generated by the decoder neural network 118 for the time step. For example, if the predicted observations 120 of the environment are predicted images of the environment, then the observation space would be a Euclidean space representing all possible images of the environment, and drawing a random sample from the observation distribution corresponds to sampling an image from the observation distribution.

The system 100 includes a controller recurrent neural network 106 that is configured to, at each of multiple time steps, receive a controller network input for the time step, and process the controller network input for the time step in accordance with the current hidden state of the controller network 106 to generate an updated hidden state of the controller network 106 for the time step. The updated hidden state of the controller network 106 is used, for example, by the attention neural network 130 to determine which data to read from the memory 110 for the time step. The hidden state of the controller network 106 is an ordered collection of numerical values (e.g., a vector or a matrix). The controller network 106 may be implemented as any appropriate recurrent neural network model, for example, a long short-term memory (LSTM) network.

In some implementations, for each time step, the controller network input for the time step includes the set of latent variables 116 for the time step.

In some implementations, for each time step, the controller network input for the time step includes an external context vector 122. The external context vector 122 is an ordered collection of numerical values. In general, the external context vector 122 represents one or more external variables that influence characteristics of the predicted observations 120 generated by the system 100. For example, if the agent 124 interacts with the environment 128 by performing actions 126 from a predetermined set of actions, then the external context vector 122 for a time step may be a representation of a planned action to be performed by the agent 124 at the time step. In this example, the external context vector 122 may be a one-hot vector representation the planned action at the time step (i.e., a vector with an entry corresponding to each action of the predetermined set of actions, where the entry corresponding to the planned action has value one, and the rest of the entries have value zero). As another example, if the environment 128 is a musical environment (i.e., an environment that is characterized by a sequence of one or more musical notes at each time step) and the predicted observations 120 are predicted sequences of musical notes that jointly represent a musical composition of a particular genre, then the external context vector 122 may be a vector indicating the musical genre (e.g., jazz or rock-and-roll).

In some implementations, for each time step, the controller network input for the time step includes the memory context vector 112.

In some implementations, for each time step, the controller network input for the time step includes the data in the memory 110.

At each time step, the system 100 updates the data in the memory 110 using the latent variables 116 for the time step, the updated internal state of the controller network 106, or both.

In some implementations, the system 100 updates the data in the memory 110 for the time step by writing the latent variables 116 for the time step to the memory 110. For example, the data in the memory 110 may be represented as a data structure with a fixed number of locations (e.g., a matrix with a fixed number of rows), and the system may write the latent variables 116 to the memory 110 on a first-in-first-out basis. Specifically, the latent variables written to the memory 110 at a particular time step may overwrite the location in the memory containing the latent variables written to the memory least recently amongst all the latent variables in the memory 110. Writing data to a location in the memory 110 refers to inserting a representation of the data into the location in the memory 110 (potentially overwriting existing data in the location). In some cases, writing data to a location in the memory 110 includes combining (e.g., by adding) the data to be written to the location in the memory 110 with the data currently in the location in the memory 110 and writing the combined data to the location in the memory 110.

In some implementations, the system 100 updates the data in the memory 110 for the time step by providing the data in the memory 110 as an input to the controller network 106 (along with the other inputs to the controller network 106) which generates an output including updated data that is written to the memory 110.

In some implementations, the system 100 updates the data in the memory 110 by generating one or more different sets of writing weights. Each set of writing weights is an ordered collection of numerical values (e.g., a vector), referred to in this specification as a write head. Each write head includes a respective writing weight for each of multiple locations in the data in the memory 110. For example, if the data in the memory 110 is represented as a matrix, then each wright head may include a respective writing weight for each of multiple rows of the data in the memory 110. In these implementations, the system writes data defined by the updated hidden state of the controller network 106 to the locations in data in the external memory in accordance with the writing weights.

Examples of systems that read and write data to and from a memory by generating reading and writing weights are described in U.S. patent application Ser. No. 14/885,086; U.S. patent application Ser. No. 15/396,289; and U.S. patent application Ser. No. 15/374,974.

The system 100 includes a training engine 102 that is configured to train the system 100 to generate sequences of predicted observations 120 that share similar properties to sequences of actual observations of the environment 128 in a set of training data 104. The training engine 102 trains system 100 by iteratively adjusting the learnable parameters of the system 100 using any standard training technique (e.g., stochastic gradient descent), including the parameters of the controller network 106, the decoder network 118, the prior generation network 114, the attention network 130, and a posterior generation network 132.

The posterior generation network 132 is configured to, at each of the multiple time steps, receive as input the memory context vector 112 for the time step and an actual observation of the environment 128 for the time step (from a sequence of actual observations from the training data 104). In some implementations, the posterior generation network 132 is configured to further receive the latent variables 116 determined for the previous time step and/or the updated hidden state of the controller network 106 for the time step as input. The posterior generation network processes the inputs in accordance with current values of a set of posterior generation network parameters to generate as output parameters of a probability distribution (referred to in this specification as a posterior distribution). The parameters of the posterior distribution define a probability distribution over the latent state space. For example, similar to the prior distribution, the parameters of the posterior distribution may be parameters of a mean vector and a covariance matrix of a multi-dimensional Normal distribution over the latent state space.

The training engine 102 uses the posterior generation network 132 to train the system 100 in a variational inference framework (to be described in more detail with reference to FIG. 2). The posterior generation network 132 can be implemented as any appropriate neural network model, for example, a convolutional neural network or a multi-layer perceptron.

Figure 2:
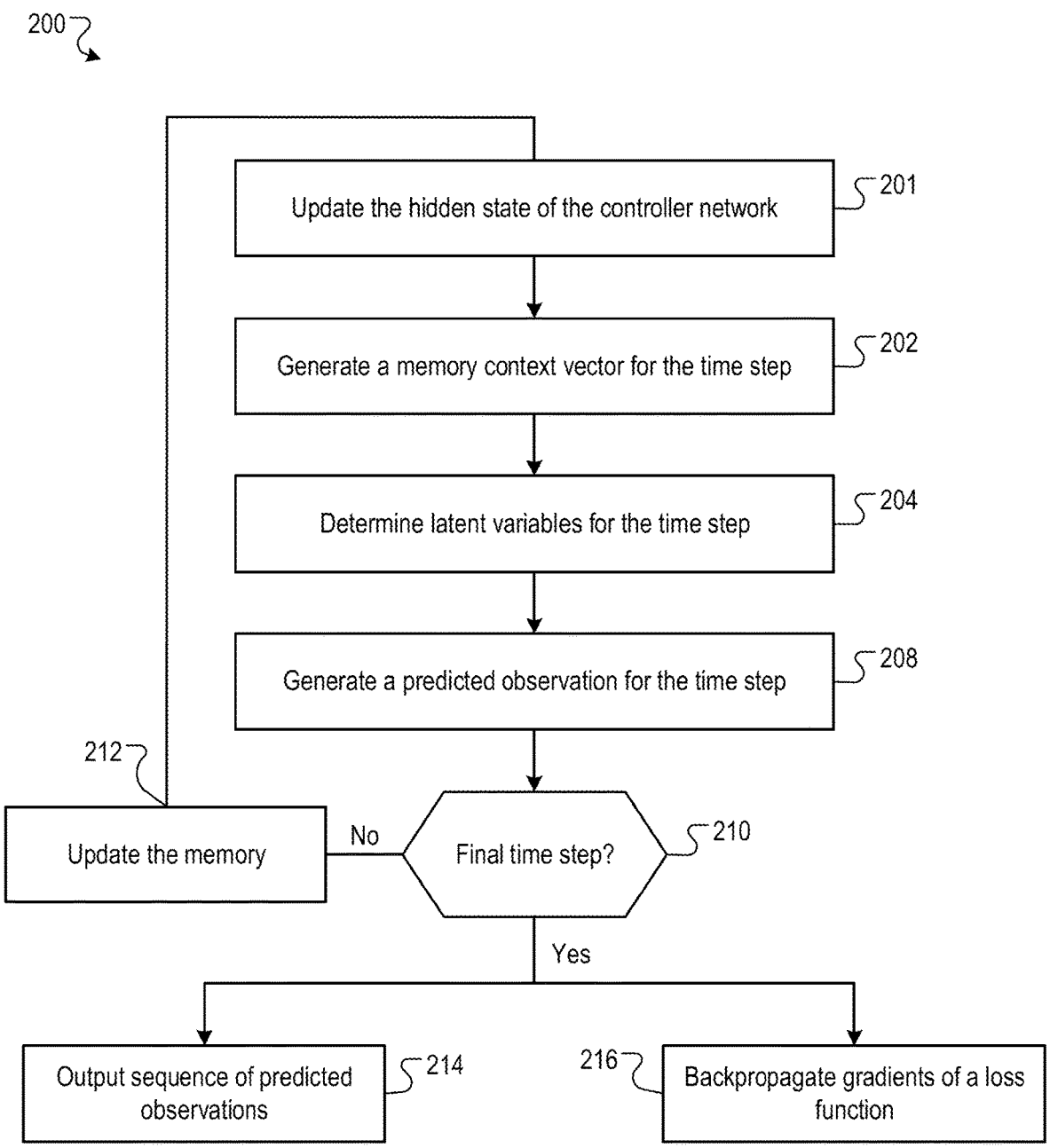
FIG. 2 is a flow diagram of an example process for generating an output sequence of predicted observations using a generative system.

FIG. 2 is a flow diagram of an example process for generating an output sequence of predicted observations. For convenience, the process 200 will be described as being performed by a system of one or more computers located in one or more locations. For example, a generative system, e.g., the generative system 100 of FIG. 1, appropriately programmed in accordance with this specification, can perform the process 200. The system performs the process 200 at each of multiple time steps.

The system updates the hidden state of the controller network (201). Specifically, the controller network receives a controller network input for the time step, and processes the controller network input in accordance with the current hidden state of the controller network to generate an updated hidden state of the controller network for the time step. The controller network input includes one or more of: the latent variables for the previous time step, an external context vector for the time step, the memory context vector for the previous time step, and the data in the memory at the time step. The controller network may be implemented as any appropriate recurrent neural network model, for example, a long short-term memory (LSTM) network.

The system generates a memory context vector for the time step by generating one or more read heads, generating retrieved memory vectors by reading data from the memory based on the read heads, and combining the retrieved memory vectors to generate the memory context vector (202). An example process for generating a memory context vector is described with reference to FIG. 3.

The system determines a set of latent variables for the time step (204).

After the system is trained, the system provides the memory context vector for the time step as input to a prior generation network. In some implementations, the system further provides the latent variables determined for the previous time step and/or the updated hidden state of the controller network for the time step as input to the prior generation network. The prior generation network is configured to process the input in accordance with the current values of the set of prior generation network parameters to generate as output the parameters of the prior distribution over the latent state space. For example, the parameters of the prior distribution may be parameters of a mean vector and a covariance matrix of a multi-dimensional Normal distribution over the latent state space. The system determines the set of latent variables for the time step by drawing a random sample from the prior distribution generated by the prior generation network for the time step.

When the system is being trained, the system provides the memory context vector for the time step and the actual observation for the time step (which is known from the training data) as input to a posterior generation network. In some implementations, the system further provides the latent variables determined for the previous time step and/or the updated hidden state of the controller network for the time step as input to the posterior generation network. The posterior generation network is configured to process the input in accordance with the set of posterior generation network parameters to generate as output the parameters of the posterior distribution over the latent state space. For example, the parameters of the posterior distribution may be parameters of a mean vector and a covariance matrix of a multi-dimensional Normal distribution over the latent state space. The system determines the set of latent variables for the time step by drawing a random sample from the posterior distribution generated by the posterior generation network for the time step.

The prior generation network and the posterior generation network can be implemented as any appropriate neural network models, for example, as convolutional neural networks or multi-layer perceptrons.

The system generates a predicted observation for the time step (208). For example, the predicted observation for the time step may be a predicted image of the environment or a feature vector characterizing a predicted state of the environment. The system provides the latent variables for the time step as input to the decoder neural network, which is configured to process the input in accordance with the current values of the set of decoder neural network parameters to generate as output parameters of the observation distribution over the observation space. For example, the parameters of the observation distribution may be parameters of a mean vector and a covariance matrix of a multi-dimensional Normal distribution over the observation space. In some implementations, the decoder neural network also receives the updated hidden state of the controller recurrent neural network for the time step as input. The system determines the predicted observation for the time step by drawing a random sample from the observation distribution generated by the decoder neural network for the time step. If the system is being trained, it generates the parameters of the observation distribution for the time step but does not actually sample a predicted observation for the time step.

The decoder neural network can be implemented as any appropriate neural network model, for example, as a de-convolutional neural network.

The system determines if the current time step is the final time step (210). In some cases, the system may determine that the current time step is the final time step if the current time step is the last time step of a predetermined number of time steps. In some cases, at each time step, the decoder neural network (or another neural network) generates an output indicating if the current time step is the final time step. In these cases, the system determines if the current time step is the final time step based on this output.

In response to determining that the current time step is not the final time step, the system updates the data in the memory (212) and returns to 201.

In some implementations, the system updates the data in the memory for the time step by writing the latent variables for the time step to the memory. For example, the data in the memory may be represented as a data structure with a fixed number of locations (e.g., a matrix with a fixed number of rows), and the system may write the latent variables to the memory on a first-in-first-out basis. Specifically, the latent variables written to the memory at a particular time step may overwrite the location in the data in the memory containing the latent variables written to the memory least recently amongst all the latent variables in the memory.

In some implementations, the system updates the data in the memory for the time step by providing the data in the memory as an input to the controller network, which receives the data in the memory along with other controller neural network inputs (as described in 201), and in addition to updating the hidden state (as described in 201), the controller network generates an output including updated data that is written to the memory.

In some implementations, the system updates the data in the memory by generating one or more different sets of writing weights. Each set of writing weights is an ordered collection of numerical values (e.g., a vector), referred to in this specification as a write head. Each write head includes a respective writing weight for each of multiple locations in the data in the memory. For example, if the data in the memory is represented as a matrix, then each write head may include a respective writing weight for each of multiple rows of the data in the memory. In these implementations, the system writes data defined by the updated hidden state of the controller network to the locations in the data in the memory in accordance with the writing weights.

If the system is being trained, then in response to determining that the current time step is the final time step, a training engine trains the system by backpropagating gradients of an objective function (216). Specifically, the training engine trains the system to generate sequences of predicted observations that share similar properties to the sequences of actual observations of the environment in the set of training data. The training engine trains the system by iteratively adjusting the learnable parameters of the system using any standard training technique (e.g., stochastic gradient descent), including the parameters of the controller network, the decoder network, the prior generation network, the attention network, and the posterior generation network.

The training engine backpropagates gradients to maximize an objective function. In some cases, the objective function is given by:

$$\mathcal{F}(\phi, \theta) = \sum_{t=1}^{T} \mathbb{E}_{q\phi(z_{<t}|x_{<t})}[\mathcal{F}_t(\phi; \theta)],$$

$$\mathcal{F}_t = \mathbb{E}_{q\phi(z_t|z_{<t}, x_{\leq t})}[\log p_\theta(x_t \mid z_{\leq t}, x_{<t})] - \mathrm{KL}(q_\phi(z_t \mid z_{<t}, x_{\leq t}) \mid p_\theta(z_t \mid z_{<t}, x_{<t})),$$

where:

$$q_\phi(z_{<t} \mid x_{<t}) = \prod_{\tau=1}^{t-1} q_\phi(z_\tau \mid z_{<\tau}, x_{\leq \tau}),$$

and where $\phi$ refers to the parameters of the posterior generation network, $\theta$ refers to the other learnable parameters of the system 100 (e.g., the parameters of the controller network), T is the number of time steps, E refers to a probabilistic expectation, $q_\phi(z_t|z_{<t}, x_{\leq t})$ refers to the posterior distribution of latent variables $z_t$ generated by the posterior generation network 132 at time step t, $p_\theta(x_t|z_{\leq t}, x_{<t})$ refers to the probability of the actual observation $x_t$ according to the observation distribution generated by the decoder neural network for time step t, and KL refers to the Kullback-Leibler divergence measure (i.e., a measure of distance between probability distributions). By adjusting the parameters of the system to maximize this objective function, the prior distributions generated by the prior generation network of the system become more similar to the posterior distributions generated by the posterior generation network, and the decoder network generates observation distributions (by processing latent variables drawn from the posterior distribution) which concentrate probability on observations similar to the actual observations of the training data.

If the system is not being trained (i.e., because it has been trained previously), then in response to determining that the current time step is the final time step, the system outputs the sequence of predicted observations for the multiple time steps (214).

Figure 3:
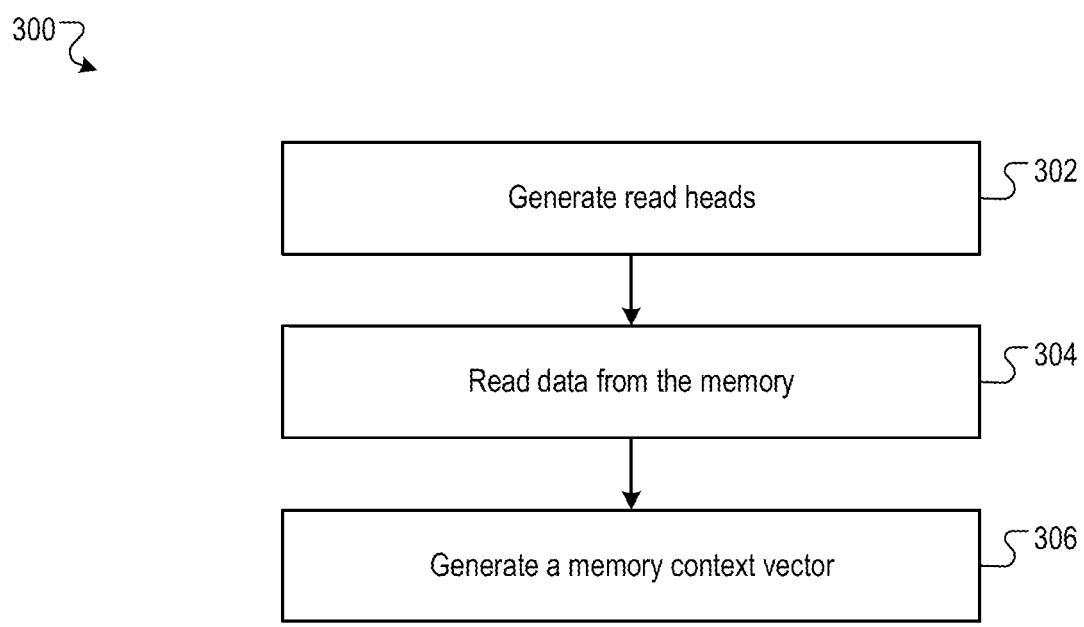
FIG. 3 is a flow diagram of an example process for generating a memory context vector.

FIG. 3 is a flow diagram of an example process for generating a memory context vector. For convenience, the process 300 will be described as being performed by a system of one or more computers located in one or more locations. For example, a generative system, e.g., the generative system 100 of FIG. 1, appropriately programmed in accordance with this specification, can perform the process 300.

The system generates a set of read heads (302).

The system provides an attention network input to an attention network, which is configured to process the attention network input in accordance with the current values of the set of attention network parameters to generate as output one or more different read heads (i.e., sets of reading weights). Each read head includes a respective reading weight for data in each of multiple locations in the data in the memory. For example, if the data in the memory is represented as a matrix, then each read head may include a respective reading weight for each of multiple rows of the data in the memory. The system processes each read head to cause the read head to have unit norm (e.g., with respect to the Euclidean norm) and non-negative values.

In some implementations, the reading weights of each read head are position-based addressing weights. In these implementations, the attention network input for the time step is the updated hidden state of the controller recurrent neural network for the time step, which is processed by the attention network to generate as output the one or more read heads. In these implementations, the attention network does not directly process the data in the memory in generating the reading weights.

In some implementations, the reading weights of each read head are content-based addressing weights. In these implementations, the attention network input for the time step is the updated hidden state of the controller network for the time step and the data in the memory for the time step, which are processed by the attention network to generate as output the one or more read heads. Specifically, the attention network processes the inputs to generate an intermediate output including one or more keys. Each key is an ordered collection of numerical values (e.g., a vector). The attention network processes each key by comparing the key to data in multiple locations in the memory to generate a corresponding read head as output. For example, for a given key, the attention network may generate a corresponding read head by determining each reading weight of the read head to be a cosine similarity measure between the key and a respective row of the data in the memory (i.e., in cases where the data in the memory is represented as a matrix).

In some implementations, the reading weights of each read head are a combination of position-based addressing weights and content-based addressing weights.

The attention neural network may be implemented as any appropriate neural network model, for example, a multi-layer perceptron or a convolutional neural network.

The system uses the read heads generated by the attention network to read data from the memory (304). Specifically, for each read head, the system generates a different retrieved memory vector. Each retrieved memory vector is an ordered collection of numerical values. For example, the system may generate the retrieved memory vectors according to the following relationship:

$$\phi^r = w^r \cdot M, \ r \in \{1, \ldots, R\}$$

where R is the number of read heads, $\phi^r$ is the r-th retrieved memory vector, $w^r$ is the r-th read head (represented as a row vector), • refers to the vector—matrix multiplication operation, and M refers to the data in the memory at the time step.

In some implementations, the system modifies the importance of each of the retrieved memory vectors for the time step based on correction biases for the time step, according to the following relationship:

$$\phi^r \leftarrow \phi^r \odot \sigma(g^r),$$

where $\phi^r$ is the r-th retrieved memory vector, $\sigma$ is a sigmoid function, $g^r$ is a scalar-valued correction bias for the r-th retrieved memory vector for the time step, ← refers to the assignment operation, and ⊙ refers to the element-wise scalar multiplication operation. The correction biases for the time step can be generated by a correction bias neural network, that is configured to receive the updated internal state of the controller network for the time step and to process the updated state of the controller network in accordance with current values of a set of correction bias neural network parameters.

The system generates the memory context vector for the time step (306). In some cases, the system generates the memory context vector for the time step by concatenating the retrieved memory vectors for the time step. In some cases, the system generates the memory context vector for the time step by concatenating both the retrieved memory vectors for the time step and the updated internal state of the controller network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method performed by one or more data processing apparatus, the method comprising, for each of a plurality of time steps:

receiving a controller neural network input for the time step;

processing the controller neural network input for the time step using a controller neural network, in accordance with a current hidden state of the controller neural network, to generate an updated hidden state of the controller neural network for the time step;

generating a memory context vector by reading data from an external memory using the updated hidden state of the controller neural network for the time step;

determining, from at least the memory context vector generated by reading data from the external memory using the updated hidden state of the controller neural network for the time step, a set of latent variables for the time step that collectively define a compressed representation of a predicted observation characterizing the environment at the time step, comprising:

receiving an actual observation characterizing an environment at the time step;

processing: (i) the memory context vector generated by reading data from the external memory using the updated hidden state of the controller neural network for the time step, and (ii) the actual observation, using a posterior map neural network to generate parameters of a posterior distribution over possible latent variable values; and sampling the latent variables from the posterior distribution in accordance with the parameters of the posterior distribution;

generating the predicted observation characterizing the environment at the time step using at least the set of latent variables.

2. The method of claim 1, wherein the controller neural network input for the time step comprises a set of latent variables generated at a previous time step that collectively define a compressed representation of a predicted observation characterized the environment at the previous time step.

3. The method of claim 1, further comprising writing data to the external memory using the set of latent variables, the updated hidden state, or both, comprising:

writing the set of latent variables for the time step to the external memory.

4. The method of claim 3, wherein writing the set of latent variables for the time step to the external memory comprises:

writing the set of latent variables for the time step to a specified location in the external memory.

5. The method of claim 3, wherein writing data to the external memory comprises:

generating a set of writing weights, wherein the set of writing weights includes a respective writing weight for each of a plurality of locations in the external memory; and writing data defined by the updated hidden state to the locations in the external memory in accordance with the writing weights.

6. The method of claim 1, wherein generating a memory context vector by reading data from the external memory using the updated hidden state comprises, for each of one or more read heads:

generating a set of reading weights for the read head from the updated hidden state, wherein the set of reading weights includes a respective reading weight for each of a plurality of locations in the external memory; and reading data from the plurality of locations in the external memory in accordance with the reading weights.

7. The method of claim 6, wherein the reading weights are position-based addressing weights.

8. The method of claim 6, wherein the reading weights are content-based addressing weights.

9. The method of claim 6, wherein the reading weights are a combination of position-based addressing weights and content-based addressing weights.

10. The method of claim 1, further comprising generating a controller neural network input for the next time step, comprising:

combining the latent variables for the time step and an external context vector to generate the controller neural network input for the next time step.

11. The method of claim 1, further comprising generating a controller neural network input for the next time step, comprising:
combining the latent variables for the time step and data from the external memory to generate the controller neural network input for the next time step.

12. The method of claim 1, further comprising generating a controller neural network input for the next time step, comprising:
combining the latent variables for the time step, data read from the external memory, and an external context vector to generate the controller neural network input for the next time step.

13. The method of claim 1, wherein the controller neural network input for the time step comprises latent variables for a preceding time step and an external context vector for the time step.

14. The method of claim 13, wherein the external context vector represents one or more external variables that influence characteristics of observations of the environment.

15. The method of claim 1, wherein for each of the plurality of time steps, generating the memory context vector by reading data from the external memory using the updated hidden state of the controller neural network for the time step comprises:
modifying the memory context vector using correction biases generated by processing the updated hidden state of the controller neural network for the time step using a correction bias neural network.

16. The method of claim 1, wherein the controller neural network and the posterior map neural network have been jointly trained to optimize an objective function that comprises, for each of the plurality of time steps, a divergence measure between: (i) the posterior distribution generated at the time step, and (ii) a prior distribution at the time step.

17. A system comprising:
one or more computers; and
one or more storage devices communicatively coupled to the one or more computers, wherein the one or more storage devices store instructions that, when executed by the one or more computers, cause the one or more computers to perform operations comprising, for each of a plurality of time steps:
receiving a controller neural network input for the time step;
processing the controller neural network input for the time step using a controller neural network, in accordance with a current hidden state of the controller neural network, to generate an updated hidden state of the controller neural network for the time step;
generating a memory context vector by reading data from an external memory using the updated hidden state of the controller neural network for the time step;
determining, from at least the memory context vector generated by reading data from the external memory using the updated hidden state of the controller neural network for the time step, a set of latent variables for the time step that collectively define a compressed representation of a predicted observation characterizing the environment at the time step, comprising:
receiving an actual observation characterizing an environment at the time step;
processing: (i) the memory context vector generated by reading data from the external memory using the updated hidden state of the controller neural network for the time step, and (ii) the actual observation, using a posterior map neural network to generate parameters of a posterior distribution over possible latent variable values; and
sampling the latent variables from the posterior distribution in accordance with the parameters of the posterior distribution;
generating the predicted observation characterizing the environment at the time step using at least the set of latent variables.

18. The system of claim 17, wherein the controller neural network input for the time step comprises a set of latent variables generated at a previous time step that collectively define a compressed representation of a predicted observation characterized the environment at the previous time step.

19. The system of claim 17, further comprising writing data to the external memory using the set of latent variables, the updated hidden state, or both, comprising:
writing the set of latent variables for the time step to the external memory.

20. One or more non-transitory computer storage media storing instructions that when executed by one or more computers cause the one or more computers to perform operations comprising, for each of a plurality of time steps:
receiving a controller neural network input for the time step;
processing the controller neural network input for the time step using a controller neural network, in accordance with a current hidden state of the controller neural network, to generate an updated hidden state of the controller neural network for the time step;
generating a memory context vector by reading data from an external memory using the updated hidden state of the controller neural network for the time step;
determining, from at least the memory context vector generated by reading data from the external memory using the updated hidden state of the controller neural network for the time step, a set of latent variables for the time step that collectively define a compressed representation of a predicted observation characterizing the environment at the time step, comprising:
receiving an actual observation characterizing an environment at the time step;
processing: (i) the memory context vector generated by reading data from the external memory using the updated hidden state of the controller neural network for the time step, and (ii) the actual observation, using a posterior map neural network to generate parameters of a posterior distribution over possible latent variable values; and
sampling the latent variables from the posterior distribution in accordance with the parameters of the posterior distribution;
generating the predicted observation characterizing the environment at the time step using at least the set of latent variables.

* * * * *